United States Patent
Ma et al.

(10) Patent No.: US 12,039,412 B2
(45) Date of Patent: Jul. 16, 2024

(54) METHOD FOR TRANSMITTING INFORMATION THROUGH TOPOLOGICAL QUANTUM ERROR CORRECTION BASED ON MULTI-SPACE-TIME TRANSFORMATION

(71) Applicant: Qingdao University of Technology, Qingdao (CN)

(72) Inventors: Hongyang Ma, Qingdao (CN); Haowen Wang, Qingdao (CN); Yingjie Qu, Qingdao (CN); Shumei Wang, Qingdao (CN); Tianhui Qiu, Qingdao (CN)

(73) Assignee: Qingdao University of Technology (CN)

( * ) Notice: Subject to any disclaimer, the term of this patent is extended or adjusted under 35 U.S.C. 154(b) by 49 days.

(21) Appl. No.: 17/873,280

(22) Filed: Jul. 26, 2022

(65) Prior Publication Data
US 2024/0046139 A1   Feb. 8, 2024

(51) Int. Cl.
*G06N 10/70* (2022.01)
*G06N 10/20* (2022.01)

(52) U.S. Cl.
CPC ............ *G06N 10/70* (2022.01); *G06N 10/20* (2022.01)

(58) Field of Classification Search
CPC ...................................................... G06N 10/70
See application file for complete search history.

(56) References Cited

U.S. PATENT DOCUMENTS

| | | | |
|---|---|---|---|
| 2021/0391873 A1* | 12/2021 | Zheng | G06N 3/045 |
| 2021/0399743 A1* | 12/2021 | Zheng | G06N 3/045 |
| 2022/0014364 A1* | 1/2022 | McCarty | G06N 10/00 |
| 2022/0253742 A1* | 8/2022 | Zheng | G06F 11/1048 |
| 2022/0374760 A1* | 11/2022 | Chiani | H03M 13/159 |

* cited by examiner

*Primary Examiner* — Joseph D Torres
(74) *Attorney, Agent, or Firm* — Greg M. Popowitz; Assouline & Berlowe, P.A

(57) ABSTRACT

A method and apparatus for transmitting information through a topological quantum error correction system based on multi-space-time transformation including steps of initializing quantum information, detecting an error in quantum information transmission, correcting the error in quantum information transmission, and decoding the information in quantum information transmission. Information safety is improved and only a quantity of devices for generating quantum states needs to be increased. A stabilizer is used to analyze code symmetry, for error detection, measurement, and correction. Any information about an encoded qubit is not revealed during odd/even parity measurement, so that an encoding state of the encoded qubit remains unchanged. A double-layer convolutional neural network model in an adversarial network can find an error correction chain with a best effect.

9 Claims, 2 Drawing Sheets

METHOD FOR TRANSMITTING INFORMATION THROUGH TOPOLOGICAL QUANTUM ERROR CORRECTION BASED ON MULTI-SPACE-TIME TRANSFORMATION

CROSS-REFERENCE TO RELATED APPLICATIONS

N/A

FIELD OF THE INVENTION

The present disclosure relates to the technical field of quantum computers, and in particular, to a method for transmitting information through topological quantum error correction based on multi-space-time transformation.

BACKGROUND OF THE INVENTION

A quantum computer has a computing capability far higher than a classical computer in resolving some problems. Therefore, the quantum computer can provide quick solutions to some computing problems for which exponential time is required in an ordinary computer. However, quantum properties of qubits are easily lost due to the influence of noise, and coherent superposition of a quantum state gradually disappears over time, leading to an information error. Therefore, ensuring that information is not destroyed in a quantum computer is a necessary condition to build a mature quantum computer.

A main challenge in building a quantum computer is that a bit flip or phase flip error is caused to due to physical qubits because qubits are quite fragile and susceptible to noise. Therefore, error information needs to be detected and corrected before being received. A challenge in correcting the error information is that an error cannot be detected. However, in a topology of a physical qubit array, a topological code that stores logical qubits can be used for error detection. A conventional quantum circuit may be limited due to inaccuracy of a basic gate and quantum decoherence. A topological quantum error correction code is currently one of the most promising implementations in quantum memories and computers. The topological code is encoded into a two-dimensional structure of qubits. This can ensure that an error is not propagated into a multi-qubit error that cannot be corrected by a quantum error correction code, consumes few resources, and is efficient. Moreover, the topological code can eliminate the influence of decoherence and inaccurate transmission during quantum information transmission. However, currently, there is no technology for correcting error information in transmission by using a topological quantum error correction code. In view of this, a method for transmitting information through topological quantum error correction based on multi-space-time transformation is proposed.

BRIEF SUMMARY OF THE INVENTION

An objective of the present disclosure is to provide a method for transmitting information through topological quantum error correction based on multi-space-time transformation, to resolve the problems proposed in the background art.

To resolve the foregoing technical problems, a first objective of the present disclosure is to provide a method for transmitting information through topological quantum error correction based on multi-space-time transformation. The method includes the following steps:

S1. initializing quantum information, encoding qubits, creating a stabilizer form, and topologically arranging encoded qubits;

S2. detecting an error in quantum information transmission through odd/even parity measurement;

S3. correcting the error in quantum information transmission; and

S4. decoding the information in quantum information transmission by using a double-layer convolutional neural network model.

In a further improvement of this technical solution, in S4, a specific method for decoding the information in quantum information transmission includes the following steps:

S4.1. finding an optimal error correction chain with a best effect based on syndromes by using the double-layer convolutional neural network model in an adversarial network, until a trivial cycle correction chain or a non-trivial cycle correction chain is finally generated; and S4.2. after finding the error correction chain with the best effect, introducing a double Q algorithm and a RestNet network to increase an error correction success rate and a training speed.

In S4.1, finding the optimal error correction chain means finally generating a trivial cycle correction chain or a non-trivial cycle correction chain after a series of bit flip or phase flip operations (as action behaviors) are conducted. When the non-trivial cycle is generated, a system obtains a minimum cumulative reward corresponding to an output eigenvalue −1; and correspondingly, when the trivial cycle is generated, the system obtains a maximum reward corresponding to an output eigenvalue +1.

In a further improvement of this technical solution, in S4.1, a specific method includes the following steps:

S4.1.1. using a syndrome as a next action to be conducted by a main body in a state space environment, and defining bit/logical bit flip or phase flip as an action-value function;

S4.1.2. inputting the state space (the syndrome) into a convolutional neural network, and providing a further correction instruction;

S4.1.3. decoding an output eigenvalue through convolution operation, conducting a multilayer connection through a fully connected network to output multiple to-be-corrected error chains, entering a double-layer fully connected network for optimization to obtain an optimal action value, and generating an optimal action-value function through the convolutional neural network and the fully connected network; and S4.1.4. approximately finding an optimal error correction chain based on the calculated optimal action value, and finally outputting a decoding result in a form of an eigenvector to find an optimal error correction chain with a better effect.

In a further improvement of this technical solution, in S4.1.1, a function expression for defining logical bit flip or phase flip as an action-value function is as follows:

$$Q_\pi(s,a)=E[U_t|S_t=s,A_t=a]$$

In a further improvement of this technical solution, in S4.1.3, a function expression of the optimal action-value function generated through the convolutional neural network and the fully connected network is as follows:

$$Q(s, a; \omega) \Box V(s; \omega^D) - \max_{a \in A} D(s, a; \omega^D);$$

where

Q(s, a; ω) is a dueling network that needs to be obtained.

In a further improvement of this technical solution, in S4.2, a specific algorithm process of introducing the double Q algorithm includes the following:

first, a method for using a dueling network in a double Q-learning algorithm is used to increase a quantity of flipped bits of an error correction chain and reduce a bit error rate threshold, one piece of state space (syndrome) is randomly extracted from the code space each time by using the double Q-learning algorithm DDQN, a syndrome needs to be processed during decoding to obtain a quadruple representation form (state function), and a sample is randomly extracted from a buffer pool for reinforced learning after an action in the DDQN algorithm is selected for a flip operation, to obtain a new syndrome;

then a mean square error between a true value and a predicted value is minimized through SGD; and then, iteration is conducted on the syndrome for several times by using the double Q algorithm, and an iteration result is propagated back to DQN to obtain a gradient, so that a quantity of flipping times for updating and optimization gradient descent, where in the DDQN algorithm, a return rate is preset to γ∈(0,1), and a parameter of the CNN network is updated through weighted averaging to obtain an optimal syndrome, to obtain an error correction chain that is closest to the calculated error correction chain, where an algorithm expression thereof is as follows:

$$\omega_{new-} \leftarrow \gamma \cdot \omega_{now+} + (1-\gamma) \cdot \omega_{now-}$$

A second objective of the present disclosure is to provide an operation platform device for implementing a method for transmitting information through topological quantum error correction based on multi-space-time transformation. The operating platform device includes a processor, a memory, and a computer program that is stored in the memory and that is run in the processor. The processor is configured to: when executing the computer program, implement the steps of the foregoing method for transmitting information through topological quantum error correction based on multi-space-time transformation.

A third objective of the present disclosure is to provide a computer-readable storage medium. The computer-readable storage medium stores a computer program. When the computer program is executed by a processor, the steps of the foregoing method for transmitting information through topological quantum error correction based on multi-space-time transformation are implemented.

Compared with the prior art, the present disclosure has the following beneficial effects:

1. In the method for transmitting information through topological quantum error correction based on multi-space-time transformation, a quantum code with a topological property is used for information encoding. In this process, quantum information can be stored in a fault-tolerant manner, it is easy to detect and correct error information, and information safety is improved.

2. Compared with other information transmission correction schemes, the method for transmitting information through topological quantum error correction based on multi-space-time transformation, in addition to required infrastructure, only a quantity of devices for generating quantum states needs to be increased, and a stabilizer can be used to describe a topological code to directly analyze code symmetry and error detection, measurement, and correction.

3. In the method for transmitting information through topological quantum error correction based on multi-space-time transformation, any information about an encoded qubit is not revealed during odd/even parity measurement, and these measurements cannot crash, or cannot prevent, in other manners, an encoding state of the encoded qubit from remaining unchanged.

4. In the method for transmitting information through topological quantum error correction based on multi-space-time transformation, a double-layer convolutional neural network model can be used in an adversarial network to find an error correction chain with a best effect, improving an error correction effect and ensuring the correctness of information communication.

5. In the method for transmitting information through topological quantum error correction based on multi-space-time transformation, a method for introducing a dueling network into a double Q-learning algorithm ensures transmission efficiency while improving information transmission efficiency and an information transmission success rate.

6. The entire solution in the method for transmitting information through topological quantum error correction based on multi-space-time transformation is relatively simple, requires a simple condition and a simple device, and is easy to implement in actual application.

DETAILED DESCRIPTION OF THE INVENTION

The following clearly and completely describes the technical solutions in the embodiments of the present disclosure with reference to accompanying drawings in the embodiments of the present disclosure. Apparently, the described embodiments are merely a part rather than all of the embodiments of the present disclosure. All other embodiments obtained by persons of ordinary skill in the art based on the embodiments of the present disclosure without creative efforts shall fall within the protection scope of the present disclosure.

Embodiment 1

Figure 1:
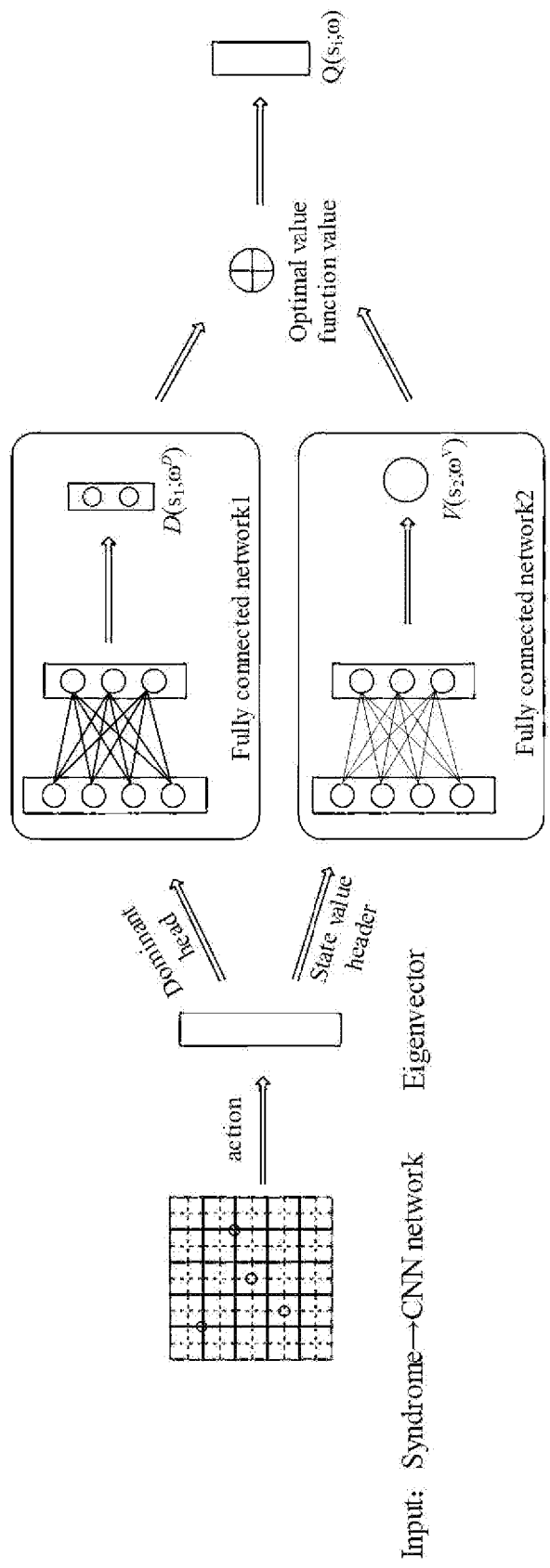
FIG. 1 is a schematic diagram of an information decoding process according to the present disclosure.
Figure 2:
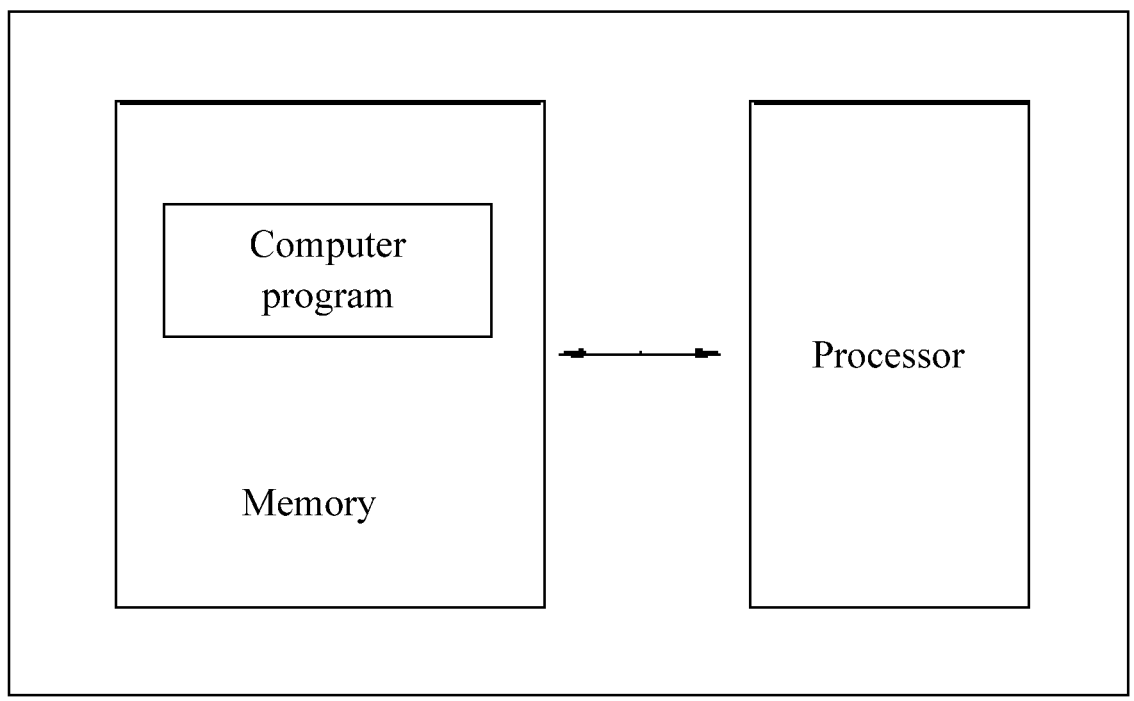
FIG. 2 is a schematic structural diagram of an example of an electronic computer platform device according to the present disclosure.

As shown in FIG. 1 and FIG. 2, this embodiment provides a method for transmitting information through topological quantum error correction based on multi-space-time transformation, including the following steps:

S1. Initialize quantum information, encode qubits, create a stabilizer form, and topologically arrange encoded qubits.

S2. Detect an error in quantum information transmission through odd/even parity measurement.

S3. Correct the error in quantum information transmission.

S4. Decode the information in quantum information transmission by using a double-layer convolutional neural network model.

Communications protocols in this embodiment are mainly divided into four parts: an initialization stage, an error detection stage of quantum information transmission, an error correction stage of quantum information transmission, and an information decoding stage of quantum information transmission. In addition, it should be assumed in advance that only bit flip and phase flip occur after information transmission is affected by noise and that an error correction scheme is not unique.

In this embodiment, in S1, a specific method for initializing the quantum information includes the following steps:

S1.1. Encode the qubits through same tribit repeated encoding, and determine code space.

S1.2. Define a unit operator as a Pauli operator, and create a stabilizer by using the Pauli operator. This facilitates subsequent defining of stabilizer code in a stabilizer form to conduct error correction. The stabilizer code is defined by specifying two sets of operators, one set of stabilizer generators, and a set of logical operators for encoding, rather than directly using a state vector packet of a codeword.

S1.3. Distribute encoded qubit information on an L×L square lattice with a topological property, and conduct error detection on the code space by using a parity check operator acting on a nearest qubit.

In S1.3, because qubits in the code space are all on a two-dimensional quantum lattice, a parity check operator acting on a nearest qubit can be used for error detection.

Specifically, in S1.1, a specific algorithm process of encoding the qubits includes the following:

the qubits are first encoded through same tribit repeated encoding, and details thereof are as follows:

$$|0\rangle_L = |0\rangle \otimes |0\rangle \otimes |0\rangle = |000\rangle$$

$$|1\rangle_L = |1\rangle \otimes |1\rangle \otimes |1\rangle = |111\rangle; \text{ wherein}$$

because a pure qubit state of one qubit is $|\omega\rangle = \alpha|0\rangle + \beta|1\rangle$, 3-qubit qubits are encoded as follows:

$$|\omega\rangle_L = \alpha|000\rangle + \beta|111\rangle; \text{ where}$$

states $|0\rangle_L$ and $|1\rangle_L$ are basic codeword states, and state space spanned by encoding states of all 3-qubit qubits is the code space.

In addition, any state that indicates error-free encoding of a quantum state is located in the code space.

In this embodiment, in S2, a specific method for detecting the error in quantum information transmission through odd/even parity measurement includes the following steps:

S2.1. Measure an odd/even parity of the qubits relative to a computing basis, that is, measure observable $Z \otimes Z \otimes Z$, where the even parity bit is related to an eigenvalue +1, and the odd parity bit is related to an eigenvalue −1.

S2.2. Conduct odd/even parity measurement between any pair of qubits used for transmitting a correct information encoding state, to obtain an even parity bit.

S2.3. Obtain one or more eigenvalues −1 based on the influence of noise that is suffered in information transmission and that includes but is not limited to a bit flip error and a phase flip error.

S2.4. Determine, based on a value with a measurement result set of a stabilizer generator as a syndrome, a location at which an error occurs, and generate, by using a X or Z string operator, multiple correction chains based on the determined location at which the error occurs.

In S2.2, during odd/even parity measurement, for example, during measurement of each of values $Z \otimes Z \otimes I$, $Z \otimes I \otimes Z$, and $I \otimes Z \otimes Z$ in normal transmission, an eigenvalue +1 is returned.

Further, in S2.4, when there is a phase flip error, for example, $|\psi\rangle_L \to (I \otimes X \otimes I)|\omega\rangle_L = \alpha|010\rangle + \beta|101\rangle$, measured values (which are $Z \otimes Z \otimes I$ and $I \otimes Z \otimes Z$ herein), information detection results −1 can be obtained. In addition, an operator in a stabilizer of a 3-qubit quantum code is the same as an operator used to detect a bit flip error in a code. In this case, when an error is also detected in the 3-qubit quantum code, one or more eigenvalues −1 are returned.

In this embodiment, in S3, a specific method for correcting the error in quantum information transmission includes the following:

first, at the location that is detected in step S2 and at which the error occurs, only syndromes are visible to a decoder; to be specific, the syndromes are used for logical operations of mapping between different states in an area in which logical qubits are located, are specifically given by X or Z string operators surrounding a torus, and respectively correspond to logical bit (bit) flip and phase flip operations;

then, these syndromes form a correction chain, and the syndromes are eliminated by using the decoder; and further, if the correction chain finally forms a trivial cycle to make the qubits return to an original state, it indicates that correction succeeds; otherwise, if the correction chain forms a non-trivial cycle winding around the torus, an error syndrome has been eliminated, but corresponding to the logical bit flip, states of the qubits are changed; in other words, this case indicates that an error correction task fails.

The syndrome includes a set of measurement results +1 and −1. When the result is +1, a charge of a quasiparticle is 0; and when the result is −1, a charge of a related quasiparticle is 1. For a z-error in an error-free code state, a pair of quasiparticles with charges +1 is created at adjacent vertexes, while a z-error adjacent to a quasiparticle with a charge +1 makes the quasiparticle move to another vertex adjacent to the error. If two quasiparticles move to a same target region, paired syndrome elimination can be implemented.

In this embodiment, in S4, a specific method for decoding the information in quantum information transmission includes the following steps:

S4.1. Find an optimal error correction chain with a best effect based on the syndromes by using the double-layer convolutional neural network model in an adversarial network, until a trivial cycle correction chain or a non-trivial cycle correction chain is finally generated.

S4.2. After finding the error correction chain with the best effect, introduce a double Q algorithm and a RestNet network to increase an error correction success rate and a training speed.

In S4.1, finding the optimal error correction chain means finally generating a trivial cycle correction chain or a non-trivial cycle correction chain after a series of bit flip or phase flip operations (as action behaviors) are conducted. When the non-trivial cycle is generated, a system obtains a minimum cumulative reward corresponding to an output eigenvalue −1; and correspondingly, when the trivial cycle is generated, the system obtains a maximum reward corresponding to an output eigenvalue +1.

Further, a specific method in S4.1 includes the following steps:

S4.1.1. Use a syndrome as a next action to be conducted by a main body in a state space environment, and defining bit/logical bit flip or phase flip as an action-value function.

S4.1.2. Input the state space (the syndrome) into a convolutional neural network, and provide a further correction instruction.

S4.1.3. Decode an output eigenvalue through convolution operation, conduct a multilayer connection through a fully connected network to output multiple to-be-corrected error chains, enter a double-layer fully connected network for optimization to obtain an optimal action value, and generate an optimal action-value function through the convolutional neural network and the fully connected network; and S4.1.4. Approximately find an optimal error correction chain based on the calculated optimal action value, and finally output a decoding result in a form of an eigenvector to find an optimal error correction chain with a better effect.

Specifically, in S4.1.1, a function expression for defining logical bit flip or phase flip as an action-value function is as follows:

$$Q_\pi(s,a)=E[U_t|S_t=s,A_t=a]$$

Specifically, in S4.1.3, a function expression of the optimal action-value function generated through the convolutional neural network and the fully connected network is as follows:

$$Q(s,a;\omega)\Box V(s;\omega^D) - \max_{a\in A}D(s,a;\omega^D)$$

Q(s, a; ω) is a dueling network that needs to be obtained.

Further, in S4.2, a specific algorithm process of introducing the double Q algorithm includes the following:

first, a method for using a dueling network in a double Q-learning algorithm is used to increase a quantity of flipped bits of an error correction chain and reduce a bit error rate threshold, one piece of state space (syndrome) is randomly extracted from the code space each time by using the double Q-learning algorithm DDQN, a syndrome needs to be processed during decoding to obtain a quadruple representation form (state function), and a sample is randomly extracted from a buffer pool for reinforced learning after an action in the DDQN algorithm is selected for a flip operation, to obtain a new syndrome;

then a mean square error between a true value and a predicted value is minimized through SGD; and then, iteration is conducted on the syndrome for several times by using the double Q algorithm, and an iteration result is propagated back to DQN to obtain a gradient, so that a quantity of flipping times for updating and optimization gradient descent, where in the DDQN algorithm, a return rate is preset to γ∈(0,1), and a parameter of the CNN network is updated through weighted averaging to obtain an optimal syndrome, to obtain an error correction chain that is closest to the calculated error correction chain, where an algorithm expression thereof is as follows:

$$\omega_{new-} \leftarrow \gamma \cdot \omega_{now+} + (1-\gamma) \cdot \omega_{now-}$$

Specifically, in the solution of this embodiment, a quantum error correction code with a topological property is used for error information correction in quantum computing and communication. Different from a conventional multi-qubit gate circuit, topological arrangement of a specific structure is conducted on a two-dimensional plane by using a topological property of a quantum error correction code with a topological property. Only information encoding needs to be implemented on a two-dimensional qubit array without changing infrastructure, thereby facilitating error detection and correction while ensuring information transmission safety. Based on error correction, an algorithm is used to find an optimal solution for error correction. This improves efficiency of error correction to ensure the accuracy of information transmission, obtains an optimal solution for error information correction, and overcomes a problem of an information error caused by noise interference in information transmission.

In addition, it should be noted that, in the procedure of the method in this embodiment, only a topological error correction code with periodic boundary conditions is used to implement error correction, but in fact, other error correction codes with topological properties can also be used for error correction.

As shown in FIG. 2, an embodiment further provides an operating platform device for implementing a method for transmitting information through topological quantum error correction based on multi-space-time transformation. The operating platform device includes a processor, a memory, and a computer program that is stored in the memory and that is run in the processor.

The processor includes one or more processing cores, and the processor is connected to the memory by using a bus. The memory is configured to store a program instruction. When executing the program instruction in the memory, the processor implements the steps of the foregoing method for transmitting information through topological quantum error correction based on multi-space-time transformation.

Optionally, the memory may be implemented by any type of volatile or non-volatile storage device or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

In addition, the present disclosure further provides a computer-readable storage medium. The computer-readable storage medium stores a computer program. When the computer program is executed by a processor, the steps of the foregoing method for transmitting information through topological quantum error correction based on multi-space-time transformation are implemented.

Optionally, the present disclosure further provides a computer program product including an instruction. When the computer program product runs on a computer, the computer is enabled to perform the steps of the method for transmitting information through topological quantum error correction based on multi-space-time transformation in the foregoing aspects.

Persons of ordinary skill in the art can understand that all or some of the steps in the foregoing embodiments may be implemented by hardware, or by instructing related hardware by using a program. The program may be stored in a computer-readable storage medium. The storage medium may be a read-only memory, a disk, a compact disc, or the like.

The basic principles, main features, and advantages of the present disclosure are described above. It should be under-

What we claim is:

1. A method for transmitting quantum information, comprising:
   initializing quantum information, encoding qubits, creating a stabilizer form, and topologically arranging encoded qubits;
   detecting an error in quantum information transmission through odd/even parity measurement;
   correcting the error in quantum information transmission; and
   decoding the information in quantum information transmission by using a double-layer convolutional neural network model;
   wherein a specific method for initializing the quantum information comprises:
   encoding the qubits through same tribit repeated encoding, and determining code space;
   defining a unit operator as a Pauli operator, and creating a stabilizer by using the Pauli operator; and
   distributing encoded qubit information on an L×L square lattice with a topological property, and conducting error detection on the code space by using a parity check operator acting on a nearest qubit.

2. The method for transmitting quantum information according to claim 1, wherein a specific algorithm process of encoding the qubits comprises:
   the qubits are first encoded through same tribit repeated encoding, and details thereof are as follows:

$|0\rangle_L = |0\rangle \otimes |0\rangle \otimes |0\rangle = |000\rangle$ $|1\rangle_L = |1\rangle \otimes |1\rangle \otimes |1\rangle = |111\rangle$;

wherein because a pure qubit state of one qubit is $|\psi\rangle_L = \alpha|000\rangle + \beta|1\rangle$, 3-qubit qubits are encoded as follows:

$|\psi\rangle_L = \alpha|000\rangle + \beta|111\rangle$;

wherein states $|0\rangle_L$ and $|1\rangle_L$ are basic codeword states, and state space spanned by encoding states of all 3-qubit qubits is the code space.

3. The method for transmitting quantum information according to claim 1, wherein a specific method for detecting the error in quantum information transmission through odd/even parity measurement comprises the following steps:
   measuring an odd/even parity of the qubits relative to a computing basis, that is, measuring observable $Z \otimes Z \otimes Z$, wherein the even parity bit is related to an eigenvalue +1, and the odd parity bit is related to an eigenvalue −1;
   conducting odd/even parity measurement between any pair of qubits used for transmitting a correct information encoding state, to obtain an even parity bit;
   obtaining one or more eigenvalues −1 based on the influence of noise that is received in information transmission and that comprises but is not limited to a bit flip error and a phase flip error; and
   determining, based on a value with a measurement result set of a stabilizer generator as a syndrome, a location at which an error occurs, and generating, by using an X or Z string operator, multiple correction chains based on the determined location at which the error occurs.

4. The method for transmitting quantum information according to claim 3, wherein a specific method for correcting the error in quantum information transmission comprises the following:
   first, at the location that is detected in step S2 and at which the error occurs, only syndromes are visible to a decoder; to be specific, the syndromes are used for logical operations of mapping between different states in an area in which logical qubits are located, are specifically given by X or Z string operators surrounding a torus, and respectively correspond to logical bit (bit) flip and phase flip operations;
   then, these syndromes form a correction chain, and the syndromes are eliminated by using the decoder; and
   further, if the correction chain finally forms a trivial cycle to make the qubits return to an original state, it indicates that correction succeeds; otherwise, if the correction chain forms a non-trivial cycle winding around the torus, an error syndrome has been eliminated, but corresponding to the logical bit flip, states of the qubits are changed; in other words, this case indicates that an error correction task fails.

5. The method for transmitting quantum information according to claim 4, wherein a specific method for decoding the information in quantum information transmission comprises:
   finding an optimal error correction chain with a best effect based on the syndromes by using the double-layer convolutional neural network model in an adversarial network; and
   after finding the error correction chain with the best effect, introducing a double Q algorithm and a RestNet network to increase an error correction success rate and a training speed.

6. The method for transmitting quantum information according to claim 5, wherein a specific method comprises the following steps:
   using a syndrome as a next action to be conducted by a main body in a state space environment, and defining bit/logical bit flip or phase flip as an action-value function;
   inputting the state space into a convolutional neural network, and providing a further correction instruction;
   decoding an output eigenvalue through convolution operation, conducting a multilayer connection through a fully connected network to output multiple to-be-corrected error chains, entering a double-layer fully connected network for optimization to obtain an optimal action value, and generating an optimal action-value function through the convolutional neural network and the fully connected network; and
   approximately finding an optimal error correction chain based on the calculated optimal action value, and finally outputting a decoding result in a form of an eigenvector.

7. The method for transmitting quantum information according to claim 6, wherein a function expression for defining logical bit flip or phase flip as an action-value function is as follows:

$$Q_\pi(s,a)=E[U_t|S_t=s,A_t=a].$$

8. The method for transmitting quantum information according to claim 6, wherein a function expression of the optimal action-value function generated through the convolutional neural network and the fully connected network is as follows:

$$Q(s, a; \omega) \square V(s; \omega^D) - \max_{a \in A} D(s, a; \omega^D);$$

wherein

Q(s,a,ω) is a dueling network that needs to be obtained.

9. The method for transmitting quantum information according to claim 8, wherein a specific algorithm process of introducing the double Q algorithm comprises the following:

first, a method for using a dueling network in a double Q-learning algorithm is used, one piece of state space is randomly extracted from the code space each time by using the double Q-learning algorithm DDQN, a syndrome needs to be processed during decoding to obtain a quadruple representation form, and a sample is randomly extracted from a buffer pool for reinforced learning after an action in the DDQN algorithm is selected for a flip operation, to obtain a new syndrome, then a mean square error between a true value and a predicted value is minimized through SGD; and then, iteration is conducted on the syndrome for several times by using the double Q algorithm, and an iteration result is propagated back to DQN to obtain a gradient, so that a quantity of flipping times for updating and optimization gradient descent, wherein in the DDQN algorithm, a return rate is preset to $\gamma \in (0,1)$, and a parameter of the CNN network is updated through weighted averaging to obtain an optimal syndrome, to obtain an error correction chain that is closest to the calculated error correction chain, wherein an algorithm expression thereof is as follows:

$$\omega_{new} \leftarrow \gamma \cdot \omega_{now+} (1-\gamma) \cdot \omega_{now-}.$$

* * * * *